Sept. 29, 1964     E. C. DE. FREYNE     3,150,696
APPARATUS FOR FILLING THERMOMETER BLANKS
Filed Oct. 17, 1960                                2 Sheets-Sheet 2

3,150,696
APPARATUS FOR FILLING THERMOMETER
BLANKS
Eudmon Canice de Freyne, London, England, assignor to Heath, Hicks & Perken (Thermometers) Limited, London, England
Filed Oct. 17, 1960, Ser. No. 63,119
Claims priority, application Great Britain Oct. 26, 1959
1 Claim. (Cl. 141—51)

This invention relates to the manufacture of thermometers and more especially to the operation of filling the thermometer blanks.

The invention consists in an apparatus for filling thermometer blanks comprising a container for the thermometer blanks, means for evacuating the container, means for filling the container with filling liquid so as to submerge the thermometer blanks and means for bringing the container back to atmospheric pressure.

The apparatus preferably also comprises means for subsequently increasing the pressure in the container above atmospheric pressure. Such means are particularly necessary in the case of maximum thermometers, such as clinicals, which incorporate a constriction in the bore. Hitherto such thermometers have been filled before making the constriction but the present invention makes it possible to make the constriction before filling.

In an apparatus forming a preferred embodiment of the invention the container for the thermometer blanks is open at its top end and is provided with a removable piece of gauze, netting or perforated plate which can be held in position to prevent the thermometer blanks from floating when mercury is used for filling.

Conveniently the container can be sealingly closed by pressing it against a downwardly facing metal surface through which ducts for the passage of air and mercury pass.

Conveniently, also, the container can be pressed against the metal surface by means of a screw jack.

The requisite valves for controlling the flow of air to and from and mercury to the container can be mounted on a metal platform against whose lower surface the container can be pressed to form a sealing joint.

A mercury container can also be mounted above the platform.

Preferably the mercury container is made gas-tight and a duct is provided for exhausting its upper portion.

One embodiment of the invention, an apparatus for filling clinical thermometer blanks, is now described for example only with reference to the accompanying drawings.

Figure 1:
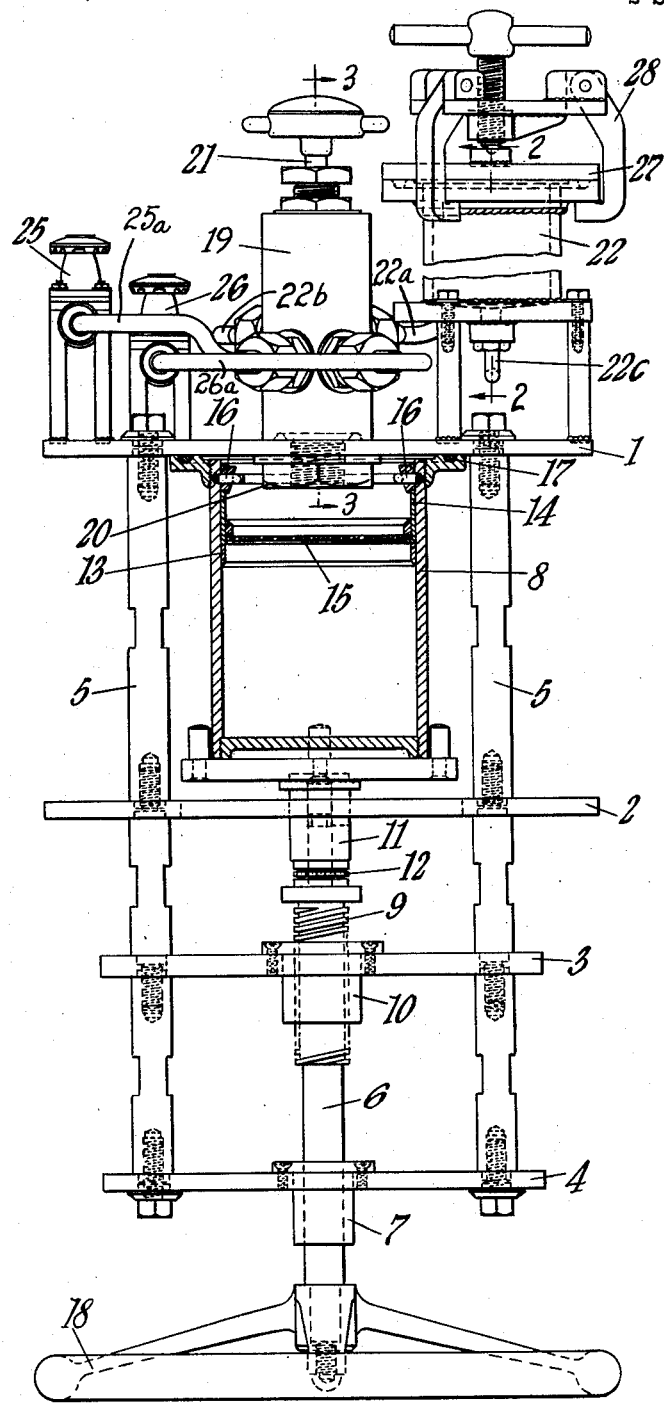
Figures 2, 3:
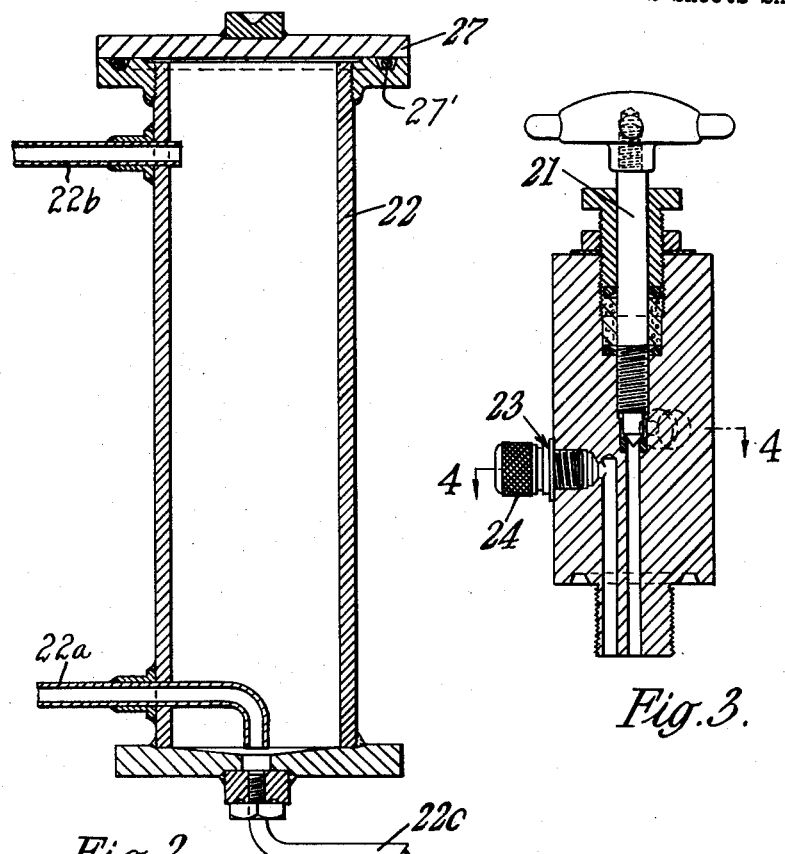
Figure 4:
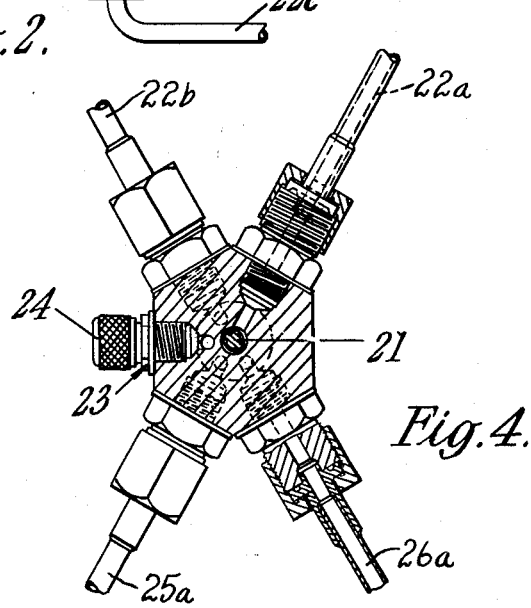

FIGURE 1 shows the apparatus in elevation and part section.
FIGURE 2 is a section on the line 2—2 of FIGURE 1.
FIGURE 3 is a section on the line 3—3 of FIGURE 1.
FIGURE 4 is a section on the line 4—4 of FIGURE 3.

The apparatus comprises a platform 1 which is connected with three lower plates 2, 3 and 4 by a number of pillars 5. A rod 6 is journaled in a plain bearing 7 bolted to the lowermost plate 4.

A container 8 for clinical thermometer blanks constructed of mild steel and having welded joints is held against the lower surface of the platform 1 by the rod 6. The latter is provided with a threaded portion 9 which screws into a nut 10 bolted to the lower plate 3. The top end of the rod 6 is of reduced diameter and fits in a hole in a thrust block assembly 11. There is also a ball thrust bearing 12 between the rod 6 and the thrust block.

The container 8, for thermometer blanks, is provided with a ledge 13 to support a circular frame 14 with a gauze bottom 15. The frame 14 is held down by the straight ends 16 of a curved handle engaging recesses in the container wall. This assembly constitutes a removable, perforated retaining means and is provided to prevent thermometer blanks from floating in mercury in the container. The top of the container 8 is provided with an upper flange having a groove in which there is a sealing ring 17. By screwing up the rod 6 by means of a wheel 18 at its lower end, a gas-tight joint can be formed between the container 8 and the platform 1.

In a hole in the platform 1 above the container a manifold 19 is held in place by a nut 20. As can be seen with reference to the FIGURES 3 and 4 of the drawings, there are the following pipe connections or conduit means providing communication to the top of the container 8 through the manifold:

(a) A connection 22a through a central needle valve 21 in the manifold with the lower part of a mercury container 22 (later to be described).

(b) A connection with the atmosphere through a vacuum and pressure release valve 23. This can be opened by turning a knurled nut 24 to allow the entry of air.

(c) A connection 25a with a vacuum pump through a vacuum valve 25.

(d) A connection 26a with a compressed air supply through a compressed air supply valve 26.

(e) A connection 22b with the upper patr of the mercury container 22.

All these connections are made so that a vacuum can be maintained when the apparatus is evacuated.

The mercury container 22 is of welded mild steel. The sealing of its top flange 27 with its lower part is ensured by a sealing ring 27 in a groove as in the container 8. The top is held on by a three-legged clamp 28. The container is provided with a drain pipe 22c leading to a gas-tight draining valve (not shown).

The operation of the apparatus is as follows:

A batch of about 500 clinical thermometer blanks is put in the container 8 with the bulb ends downwards. The frame 14 is then put in position and the container forced up against the undersurface of the plate 1 by means of the wheel 18 so that a sealing joint is made. Sufficient mercury to cover the blanks in the container by ½" above the gauze 15 is placed in the mercury container 22 and its top 27 screwed down by means of the three-legged clamp 28.

With the valves 21, 23 and 26 closed, the vacuum valve 25 is opened so that the air in the container 8 and above the mercury in the mercury container 22 is evacuated. When the requisite vacuum is obtained, the valve 21 is opened and mercury flows into the container 8 so as to cover the thermometer blanks. The vacuum valve 25 is kept open during this time to remove air around the needle of the valve 21. The valve 25 is then shut. The vacuum and pressure release valve 23 is opened for about 30 seconds and then closed and the compressed air valve 26 is opened until there is a gauge pressure of 5 p.s.i. in the apparatus. This pressure is held for two or three minutes and a series of 5 p.s.i. increments in pressure made at similar intervals until 20 p.s.i. is reached. The apparatus is then held in this condition for 15 minutes.

The compressed air valve 26 is then closed and the pressure released by means of the vacuum and pressure release valve 23. The container 8 is then released by turning the wheel 18. The blanks, filled with mercury, are taken out after pouring off the mercury from the container.

Various modifications may be made within the scope of the invention.

I claim:

Apparatus for filling thermometer blanks comprising a mounting plate, a removable container for thermometer blanks, said container being open at its top; removable, perforated retaining means in said container for preventing thermometer blanks from floating when the container is filled, said container having an upper sealing flange, means for mounting said container under said plate and for forcing it against the under surface of the plate to effect a sealing joint therewith, a manifold mounted on said plate and communicating therethrough with said container, a second container for mercury mounted above said plate, means for sealing said second container, conduit means communicating with said manifold and through which a vacuum can be applied, a valve controlling said conduit means, second conduit means for providing a supply of compressed air to said manifold, a valve controlling said second conduit means, a vacuum and pressure release valve for connecting said manifold to atmosphere, third conduit means providing communication between said manifold and the upper portion of said mercury container, additional conduit means providing communication between said manifold and the lower portion of said mercury container and a valve for controlling said additional conduit means.

References Cited in the file of this patent

UNITED STATES PATENTS

| | | |
|---|---|---|
| 1,345,347 | Chaney | July 6, 1920 |
| 1,922,458 | Schaeffer | Aug. 15, 1933 |
| 2,066,356 | McCrosson | Jan. 5, 1937 |
| 2,126,532 | Cate | Aug. 9, 1938 |
| 2,783,786 | Carter | Mar. 5, 1957 |
| 2,815,621 | Carter | Dec. 10, 1957 |
| 2,877,611 | Anrep | Mar. 17, 1959 |
| 2,884,963 | Erndt | May 5, 1959 |

FOREIGN PATENTS

| | | |
|---|---|---|
| 999,411 | France | Oct. 3, 1951 |
| 1,204,807 | France | Aug. 10, 1959 |